No. 656,778.  Patented Aug. 28, 1900.
C. H. WILSON.
HANDSAW.
(Application filed Jan. 15, 1900.)

(No Model.) 2 Sheets—Sheet 1.

WITNESSES:
H. G. Dieterich
John E. Burch

INVENTOR
Charles Howard Wilson
BY
Johnson & Johnson
ATTORNEYS

No. 656,778. Patented Aug. 28, 1900.
C. H. WILSON.
HANDSAW.
(Application filed Jan. 15, 1900.)
(No Model.)
2 Sheets—Sheet 2.

WITNESSES:
H. G. Dieterich.
John E. Burch.

INVENTOR
Charles Howard Wilson
BY
Johnson & Johnson
ATTORNEYS

UNITED STATES PATENT OFFICE.

CHARLES HOWARD WILSON, OF NEW YORK, N. Y.

HANDSAW.

SPECIFICATION forming part of Letters Patent No. 656,778, dated August 28, 1900.

Application filed January 15, 1900. Serial No. 1,533. (No model.)

*To all whom it may concern:*

Be it known that I, CHARLES HOWARD WILSON, a citizen of the United States, residing at New York, (Brooklyn,) in the county of Kings and State of New York, have invented certain new and useful Improvements in Handsaws, of which the following is a specification.

The invention herein is directed to novel constructions in saws whereby the saw-blade is so mounted and secured to the frame as to obtain firmness and durability of the connections, to render convenient the removal and replacement of the saw-blade, to maintain a perfect support of the blade, and to avoid the swaying of the saw-blade; and my invention consists of devices and combinations of devices, which are set out in the following description and the claims at the end thereof and illustrated in the accompanying drawings, in which—

Figure 1:
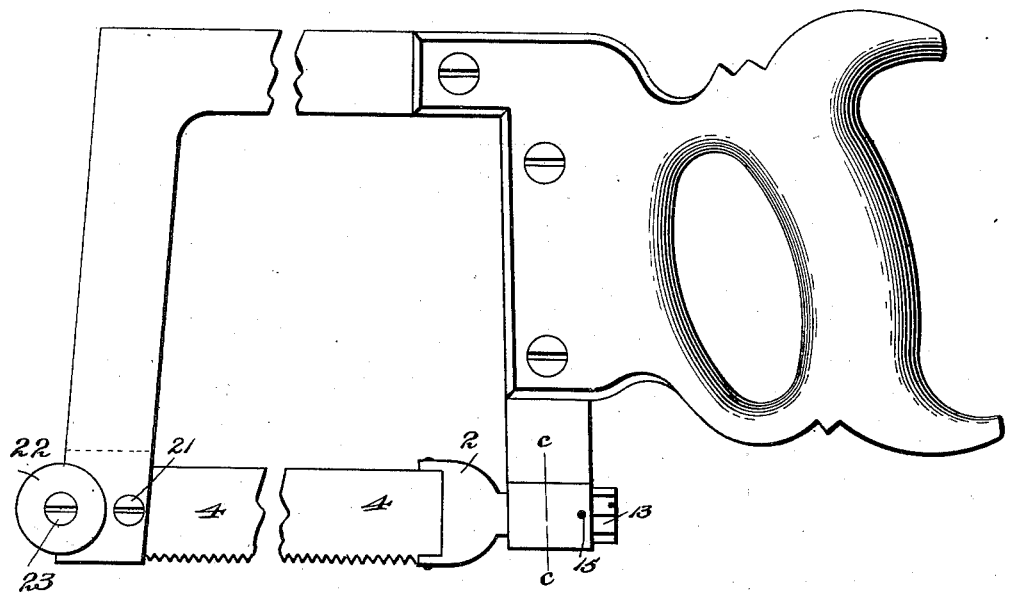
Figure 2:
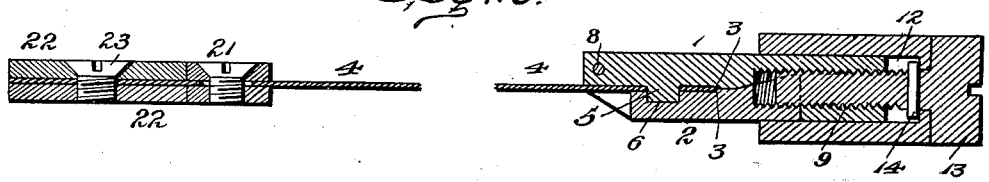
Figure 3:
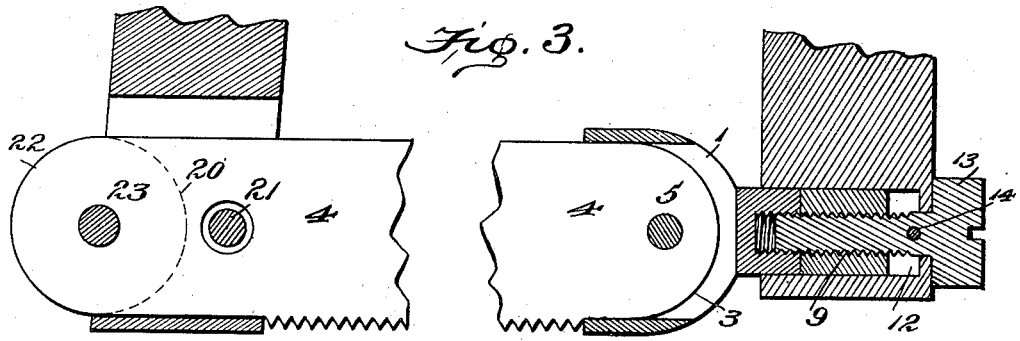
Figure 4:
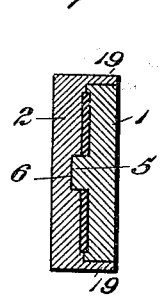
Figure 5:
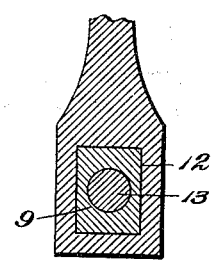
Figure 6:
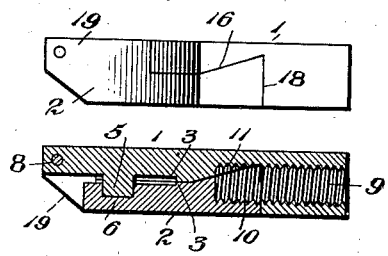
Figure 7:
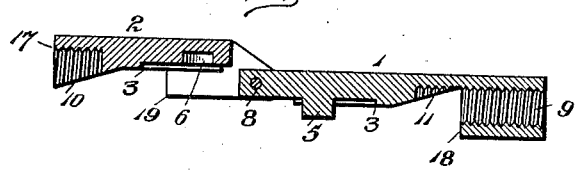
Figure 8:
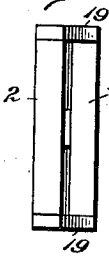
Figure 9:
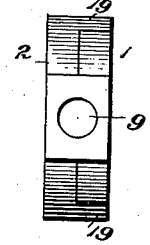
Figure 10:
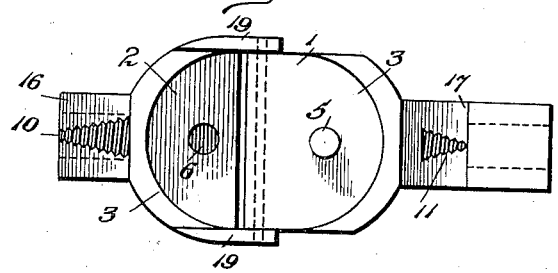
Figure 11:
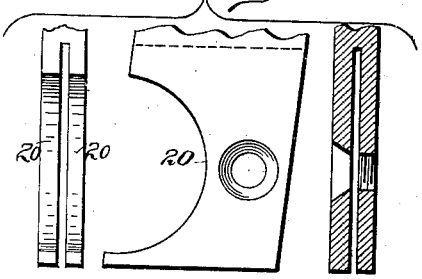
Figure 12:
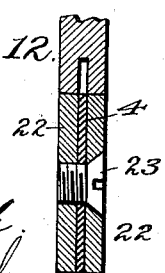
Figure 13:
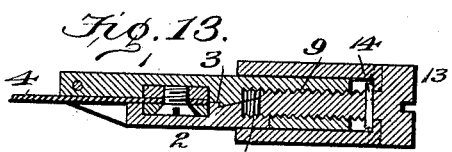

Figure 1 shows the handle and off-end parts of a saw-frame and the corresponding ends of the saw-blade secured thereto in accordance with my improvements. Fig. 2 is a horizontal section taken through the blade and the cylindrical fastenings therefor to the frame. Fig. 3 is a vertical section taken through the same parts. Fig. 4 is a cross-section taken through the buckle cylindrical set-pin bearing. Fig. 5 is a vertical section on the line *c c* of Fig. 1, showing the square opening for the buckle-fastening square shank part. Fig. 6 is a side view and longitudinal section of the buckle-fastening without the blade; and Fig. 7 is a longitudinal section of the same, the parts being opened to show their connecting-pivot. Fig. 8 shows the pivoted end of the buckle; Fig. 9, its square shanked end. Fig. 10 shows the meeting faces of the two buckle parts as opened on their pivot. Fig. 11 shows the split and recessed off frame end. Fig. 12 is a vertical section taken through the circular binders of the blade at the recessed end of the frame, and Fig. 13 shows in horizontal section a modification of the cylindrical interlocking blade-engaging bearing and its clamping buckle members.

While I have shown my novel blade-fastening devices as applied to what is known as a "meat-saw," they may be applied to other saws.

In metal frames the right-angled ends have a construction adapted to receive the fastening devices for the blade. At its handle end the frame has an opening of rectangular form, which preferably does not extend through it and within which a buckle device for the saw-blade is secured. This buckle device and its cylindrical bearing for engaging the handle end of the blade and the provision of cylindrical bearing binding-plates fastened to the blade by a screw central with the plates and the concave frame-bearing for engaging the off end of the saw-blade form features of my improvement. Two members 1 and 2, which by their interlocking meeting faces engage, bind, and secure the blade, constitute the buckle and are pivoted together at their blade-connecting ends, their other ends being bound together within the opening of the frame. The meeting faces of these members have surface shoulders 3 3, conforming to the rounded ends of the blade 4, which has a hole for receiving a cylindrical bearing, which I call a "set-pin" 5, projecting from the face of the member 1 and engaging a recess 6 in the meeting face of the other member 2, with the blade between them, the end of which is firmly bound by the shoulders, the cylindrical engaging bearing, and the meeting faces of the members. The pivot 8 of these members is at one side of the blade, as in Fig. 2, and this allows the blade to be seated and the two buckle parts to lap flush, with their clamping-faces interlocking when the recessed part is placed to engage the set-pin and to clamp and engage the blade. From the shoulders the two members terminate each in a square shank, the shank of the part having the set-pin being formed with a screw-threaded hole 9, while the shank part having the recess 6 for the set-pin is shorter and is formed with a screw-threaded recess 10, matching a similar recess 11, which is formed in the other member as a continuation of the threaded hole 9. The meeting faces of these screw-threaded recesses are oblique to such faces. When, therefore, the two buckle parts are closed, these threaded recesses form a prolongation of the screw-threaded hole centrally of the length of the buckle. The opening 12 in the handle end of the frame and the meeting shank parts of the buckle are of square cross-section, and the shank parts fit closely within the opening to hold the shank parts together in clamping function upon the blade. The screw-threaded recess 10 of the buckle part 2 completes the screw-threaded hole 9 of the other buckle part, as in Figs. 2, 3, and 6. A circular hole is made in the outer end wall, Figs. 2 and 3, of this square opening, through which a screw 13 is inserted to engage the threaded shank parts, which together form a screw-nut, and by turning the screw draws the buckle and tightens the blade and keeps it taut and firm in its buckle-fastening. A pin 14 is inserted through a hole 15, Fig. 1, in the frame and a hole in the screw-shank to hold it against endwise movement in the frame. At the threaded recesses 10 and 11 the meeting faces 16, Fig. 6, are oblique to the axis of the screw and the square end 17 of the threaded part 10, which abuts against the square end 18 of the threaded part 9. These oblique face parts form interlocking shoulders which reinforce the set-pin bearing in binding the buckle parts together and preventing any unequal drawing action of the screw-bolt upon the separate buckle parts, so that the two parts act as a single fastening in keeping the blade firmly between them, while the square screw-shank parts 9 10 in the frame-opening keep the buckle parts firmly bound together.

The pivoted end of the buckle part 2 has side flanges 19, through which the pivot-pin 8 passes at one side of the blade, and between these sides the other buckle part 1 fits, so that there is no strain upon the pivot-pin, while the end of the blade is seated between and supported by the sides 19 and the shoulders 3 to give a solid bearing at the end and at the edges of the blade, as in Fig. 3. The off end of the frame is split to give it the function of a clamp upon the blade, the end of which projects through the split and is rounded, as in Fig. 3. These split parts at their outer edges are formed with a semicircular recess 20, Fig. 11, which forms a clutch-seat for the blade circular bearing-plates, and a countersunk screw 21, passing through the split parts and the blade, clamps it to the frame, as in Fig. 2. This screw-fastening is reinforced by a pair of circular plates 22, which are clamped upon and form separate fixed bearing parts on the end of the blade by a screw 23, the head of which is countersunk in one of the circular plates, while the circular plates have a bearing upon the semicircular seat formed by the frame-recess 20. These plates form a hub-binder bearing as fixed parts for the blade and a cylindrical support in the frame-recess, which bears all the strain of the screw 13 in tightening the blade. The cylindrical bearing of these hub-binders keeps the blade true, and the hole in the blade through which the clamping-screw 21 passes being larger than the screw the latter is thereby relieved of all strain in tightening the saw. As the binder bearing-plates are firmly clamped upon the saw-blade by the screw, the latter must therefore while being central with the plates form the center of the concave frame-seat, so that the bearing-plates form fixed abutments on the blade, making it as thick as the frame. The screw 21 engages one of the split parts, and the screw 23 engages one of the circular binder-plates, as in Fig. 2, and this gives to both screws their binding function upon the saw-blade. The pivot of the buckle parts is formed by the pin 8, so that when closed the meeting faces come together upon the blade at one side of the pin, so as not to interfere with the placing of the blade.

Advantageous results are particularly due to the provision of the cylindrical bearings at each end of the blade, and particularly by the separate hub-plates bound fast upon the off end of the saw-blade by a clamping-screw central with said plates and with the concave frame-bearing and always in the axial line with the adjusting-screw, so that it is not possible for the blade to have any swaying movement at the bearings or any direct tension or strain upon the screw which binds the hub-plates to the saw. These clamped bearing-plates give increased thickness to the blade and brace and strengthen it, because when bound upon the blade these bearing-plates become practically integral parts thereof and form fixed shoulders thereon. Their removal is not necessary either for adjustment or removal of the blade.

I make one of the buckle parts shorter than the other, so that the screw-threaded ends of each will meet and abut to cause the adjusting-screw to enter each shank part, and it is obvious that when the two parts are in clamping relation the oblique shoulder-forming parts and the shank-abutting ends will make the parts as one piece.

It will of course be understood that so far as the employment of fastening devices composed of two parts for clamping the ends of the blade are concerned the separate parts of each fastening device may take various forms, so long as the blade at one end is fastened by a cylindrical bearing to an adjustable clamping buckle device, while at its other end the blade has a frame-bearing formed of two cylindrical bearing binder parts fixed upon the blade by a screw central with the binder parts and the concave frame-bearings and seated upon the frame, and that the details of construction may be varied without departing from the spirit of my invention.

Obviously the form or contour of the off-end-frame bearing parts and the binders may be changed, the purpose of the recess and binding-plates being to distribute the strain upon the entire abutting surfaces.

In the modification shown in Fig. 13 the set-pin and interlocking recess for forming a cylindrical engaging bearing for the blade between the buckle parts are substituted by circular binder-plates seated each in a recess in the meeting faces of buckle parts and clamped together by a countersunk screw upon the blade in a manner identical with the binder-plates which fasten the off end of the blade to the frame and are clamped upon the end of the blade.

I claim—

1. In a saw, a frame having the outer edge of its off end, formed with a concave recess, separate binder parts on each side of the blade forming supporting-bearings therefor and having a contour conforming to and abutting upon the concave walls of the frame and means for clamping the binder parts upon the blade concentric with the concave frame-walls, whereby the strain upon the parts is distributed upon the binders and the frame concentric with said clamping-screw.

2. In a saw and in combination with the blade and a frame having its off end split and formed on its outer edge with a concave recess, means for fastening the off end of the blade to the frame within the split consisting of a pair of separate circular binder-plates seated on the concave edges, a screw engaging one of the binders and clamping the saw-blade between them, and means whereby the handle end of the blade is adjustably secured to the frame.

3. In a saw and in combination with the blade and a frame having its off end split and formed on its outer edge with a concave recess, means for fastening the off end of the blade, to the frame within the split consisting of a pair of separate circular binder-plates clamped on the blade and seated on the concave edge, a screw central with and engaging one of the binders clamping the saw-blade between them, and a screw engaging one of the split parts clamping the blade between them and means whereby the handle end of the blade is adjustably secured to the frame.

4. In a saw and in combination with a frame having its handle end formed with a square opening, means for connecting and supporting the blade therein consisting of a buckle having a part formed with a set-pin and a square shank having a screw-threaded hole, and a part of less length formed with a corresponding square shank having a screw-thread forming an extension of the threaded hole, and a recess adapted to engage the set-pin, a screw for engaging the screw-threaded shank parts within the square frame-opening, and means whereby the screw is fastened within said opening.

5. In a saw and in combination with a frame having a concave recess in its off end and the blade having convex bearing circular binder parts centrally clamped to and engaging the concave edge of the frame, and an adjustable connection engaging the other end of the blade with the frame.

6. In a saw and in combination with a frame having its off end split and formed with concave edge recesses, its handle end having a square opening, a buckle of two clamping parts each part engaged with and clamped upon the blade, means whereby both parts are interlocked and connected together within the square opening and means whereby the off end of the blade is seated within and upon the edge recess.

7. In a saw and in combination with the frame having a horizontal square opening in its handle end and the blade, a buckle of two members one part interlocking the blade with the other part and both parts having shanks meeting and abutting within the frame-opening, and a screw secured to the frame and engaging both the shank parts within the said frame-opening.

8. In a saw and in combination with the frame and the blade, a buckle of two members pivoted together and connected to the blade at the pivoted end, the other end of one member terminating in a square shank pierced with a screw-threaded hole, the other member of less length terminating in a corresponding square shank and having a screw-threaded recess forming an extension of the threaded hole, means for interlocking and clamping the blade between the members and an adjusting-screw engaging the frame and both the said buckle members.

9. In a saw and in combination with the frame and the blade, the off end of the frame split and formed with edge concave recesses, a binder-bearing for the blade comprising a pair of separate plates one on each side of the blade each having cylindrical peripheries and seated within the concave edge recesses, a central clamping-screw engaging one of the binder-plates and a screw engaging one of the split frame parts whereby the split parts and the binder-plates are clamped together and upon the saw-blade.

10. In a saw and in combination with the frame and the blade, the latter rounded at both ends having a hole at its handle end and a pair of holes at its off end, a buckle of two members one of which has a set-pin engaging the blade-hole, the other member has a recess engaging the set-pin, means for connecting the members together at both ends and means for adjustably securing the connected members together in the frame-opening, a pair of circular binders for the off end of the blade each having a bearing upon the frame, a clamp-screw passing through the binders and the blade and a screw clamping the split parts.

11. In a saw and in combination with a frame and the blade, a fastening for the handle end of the latter consisting of two members one of which has a surface cylindrical set-pin, an oblique shoulder-forming surface part and a square shank having a screw-threaded hole, the other part being of less length and having a circular recess adapted to engage the set-pin, an oblique shouldered part, a square shank, and a screw-threaded recess forming an extension of the threaded hole, both parts hinged together, their meeting faces intermatching upon the saw-blade, their shank parts secured together within a frame-opening, an adjusting-screw engaging the frame and the buckle members and means for fastening the off end of the blade.

12. In a saw and in combination with a frame and the blade, a fastening device for the handle end of the frame comprising a buckle of two members pivoted together at the blade-connecting end means whereby their other ends are adjustably secured to the frame, and means whereby the blade is fastened between the buckle parts between their pivoted ends and the frame connections.

13. In a saw and in combination with a frame and the blade, a buckle-fastening for the handle end of the blade consisting of two parts, their meeting faces having shouldered seats for the blade, and oblique interlocking surface parts, a set-pin on one of said parts engaging a hole in the blade and a corresponding recess in the other clamping part, each part terminating in abutting square shanks having screw-threads in alinement and pivoted together at their blade-connected ends, their other ends bound together within the walls of an opening in the frame, and a screw-bolt engaging the frame and the buckle screw shank parts.

14. In a saw and in combination with the blade and a frame having a horizontal square opening in its handle end, a buckle-clamp of two parts, each having a square shank meeting in alinement, a screw secured to the frame and engaging both shank parts within said frame-opening, and a cylindrical bearing between the clamp parts engaging them and the blade and a pin pivoting the ends of the clamp parts between said blade-bearing and the off end of the frame.

15. In a saw and in combination with the frame having a horizontal square opening in its handle end and the blade, a buckle device of two members, one of which has a cylindrical bearing-pin for engaging a hole in the blade, the other a recess for engaging the pin and the blade, means whereby the members are connected at their inner ends, their outer ends terminating in square shanks within the walls of the frame-opening, and means for adjustably securing the shanks therein to the frame.

16. In a saw and in combination with a frame having an angular opening in its handle end, and the blade, a fastening device for the blade comprising a buckle of two members pivoted together at their blade-connected ends, means whereby their other ends are connected and secured within said frame-opening, and means whereby the blade is fastened to and between the buckle members between their pivot and their frame-connected ends.

17. In a saw and in combination with the frame and the blade, a circular bearing of separate plates, a screw centrally clamping them to the blade at the off end of the frame, a buckle fastening part, having a cylindrical bearing connection for the blade at the handle end of the frame and to the buckle part, and means connected to the frame for securing and adjusting it.

18. In a saw and in combination with a frame having a split off end and an open concave recess in the outer edge of each split part, and the blade, of circular binder parts seated within the recess upon the frame and upon the blade, and means for clamping them together centrally upon the blade and concentric with the frame-recess.

19. In combination with the saw-blade and the frame having a split off end, of circular binder parts for the blade seated upon the split parts, means for clamping the binder parts upon the frame and the blade a fastening device for the handle end of the blade, having an angular seating in the frame and a bearing engaging the blade between the frame-fastenings.

20. In a saw and in combination with the frame and the blade, circular bearing parts a screw centrally clamping them to the blade, a seating in the off frame end concentric with said clamping-screw against and upon which the circular bearing parts abut, a buckle-clamp of two parts engaging the blade between them and engaging each other, means connecting the clamp with the handle end of the frame, and means whereby the clamp is adjusted in the frame.

21. In a saw and in combination with the blade and a frame having a split off end, and a square opening in its handle end of separate binder parts seated in the separate split parts and means whereby the binder parts are centrally clamped together upon the blade, and a buckle-clamp connecting the other end of the blade and frame for drawing the binder parts against the frame consisting of a screw secured to the frame and engaging the buckle-clamp within said square frame-opening.

22. As a means for fastening the off end of the blade to the split end of the frame, the screw passing through the split parts and clamping the blade between them in combination with circular bearing binder-plates, and a screw centrally clamping them to the blade and forming the center of the bearing on the frame for the clamped plates, the frame-clamping screw passing through but not engaging the blade.

23. In a saw, a U-frame having its off end split and a concave recess in its outer edge at the split, its handle end having a horizontal square opening closed at its outer end, in combination with the blade, a pair of circular binder-plates engaging the frame concave recess, a screw centrally clamping the binder-plates to the blade, a screw clamping the split parts upon the blade, a buckle-clamp engaging the handle end of the blade, and the walls of the frame-opening, and an adjusting-screw engaging the frame and the buckle.

In testimony whereof I affix my signature in presence of two witnesses.

CHARLES HOWARD WILSON.

Witnesses:
FREDRICK G. WILSON,
FREDERICK J. DASSAU.